United States Patent [19]
Cho et al.

[11] Patent Number: 5,295,067
[45] Date of Patent: Mar. 15, 1994

[54] ORDER PLANNING SYSTEM WHICH TRANSFORMS EXISTING ENGINEERING RELATIONSHIPS INTO AN ORDER PLANNING KNOWLEDGE BASE

[75] Inventors: Howard H. Cho, Middletown, N.J.; Denis L. Collet, Kingston, N.Y.

[73] Assignee: International Business Machines Corporation, Armonk, N.Y.

[21] Appl. No.: 55,946

[22] Filed: Apr. 28, 1993

Related U.S. Application Data

[63] Continuation of Ser. No. 516,483, Apr. 30, 1990, abandoned.

[51] Int. Cl.$^5$ .............................. G06F 15/24
[52] U.S. Cl. ..................................... 364/401
[58] Field of Search .................. 364/401, 403; 395/10, 395/21

[56] References Cited

U.S. PATENT DOCUMENTS 4,591,983  5/1986  Bennett et al. ................... 364/403
4,924,408  5/1990  Highland ........................... 364/513

OTHER PUBLICATIONS

Discrete Mathematical Structures with Applications to Computer Science, J. P. Tremblay, R. Manohar, University of Saskatchewan, Saskatoon.
IBM Tech. Disc. Bulletin, vol. 31, No. 2, Jul. 1988, "Template Join for Processing Recursive Logic Queries in a Loosely Coupled Environment", (K. Y. Whang).
IBM Tech. Disc. Bulletin, vol. 31, No. 10, Mar. 1989, "System Upgrade Utility", (Customer Configuration), (C. Harney & I. Miller).
IBM Tech. Disc. Bulletin, vol. 31, No. 12, May 1989, "HP&CS: An Expert System Configurator for the IBM 9370", (Arnold, Baxter, et al.).
HPCS: An Expert System Configurator for the IBM 9370, V. Arnold, A. Dunbar, ESD/SMI Expert Systems Proceedings, Apr. 1988.
Expert Systems for Configuration at Digital: XCON and Beyond, Mar. 1989, vol. 32, No. 3, Communications of the ACM.
IBM Tech. Disclosure Bulletin, vol. 30, No. 1, Jun. 1987, pp. 360–366.
Eng. Soc. Proceedings, ESD/SMI Expert Systems, Apr. 14, 1988, Detroit, U.S.A., pp. 303–315, Arnold, Dunbar, "HPCS: An Expert System Configurator for the IBM 9370".
Communications of the ACM vol. 32, No. 3, Mar. 1989, pp. 298–318, Barker, O'Connor, "Expert Systems for Configuration at Digital: XCON and Beyond".

*Primary Examiner*—Gail O. Hayes
*Attorney, Agent, or Firm*—W. A. Kinnaman, Jr.; M. S. Walker

[57] ABSTRACT

A system for order planning that translates an order configuration into a list of bills of materials list. The system operates based upon a first logical specification of relationships between models, optional features or device codes and required material components. The first logical form of relationships is transformed into an unambiguous statement of relationships. These relationships are then encoded to provide a compact knowledge base for evaluation of orders and order plans. Each order is encoded in a manner that allows rapid comparison with the predicates specified in the knowledge base. The order evaluation mechanism is independent of the knowledge base allowing the knowledge base to be updated in response to changes in design or relationships. A pre-processor can be introduced evaluate even more complex logical relationships between models and device codes using similar logical principles based on that comparison bill of material one assigned to a list to form a complete a complete manufacturable configuration.

12 Claims, 5 Drawing Sheets

| INDEX | TERM |
|---|---|
| 001 | D0001 |
| 001 | D0205 |
| 003 | D0206 |
| ... | ... |
| 131 | B379 |
| ... | ... |

ORDER PLANNING SYSTEM WHICH TRANSFORMS EXISTING ENGINEERING RELATIONSHIPS INTO AN ORDER PLANNING KNOWLEDGE BASE

CROSS-REFERENCE TO RELATED APPLICATION

This application is a continuation of application Ser. No. 07/516,483, filed Apr. 30, 1990, now abandoned.

BACKGROUND OF THE INVENTION

1. Field of the Invention

The present invention relates generally to manufacturing order planning and processing of orders for items containing a multitude of parts, and more specifically to computer systems to aid in the evaluation and interpretation of order information.

2. BACKGROUND

Manufacturing order planning is a significant problem in any industry producing and selling complex manufactured articles. The order planning process requires consideration of the types and models of a device that are expected to be ordered and shipped to customers. Each device may have a series of optional features or configurations that require different basic manufacturing parts or subassemblies.

Articles are typically sold to the customer by a sales person based upon a description of the basic model, optional devices, features and configurations. These descriptions must be in a form that is understandable by both the sales staff and customers. Such descriptions represent a level of abstraction that cannot be directly translated into a unmanfacturable product without an evaluation of the production rules governing model and device interactions. A manufacturing organization must be able to translate orders specified in terms of model and device codes into specific requirements for manufactured parts or assemblies. The end product of the manufacturing order planning process is a bill of materials that specifies detail, the parts necessary to fulfill the order. Long range planning is accomplished by analyzing hypothetical orders representing an expected configuration mix. A number of analyses may be performed based upon varied order configuration assumptions.

An actual or hypothetical order is converted into bills of material through consideration of engineering specifications and relationships documented by the manufacturing engineering staff. The engineers describe the relationships between the various models, features and components of a final assembled article. The requirements of the final assembly are interdependent such that a particular feature or option may require yet another feature to be added to the order. System constraints may be specified by stating that no more than a given number of a particular device may be added or, that at least a certain number of one type of device must be present in the final assembly.

The process of "exploding" the order into the final bill of materials has traditionally been a difficult, labor intensive process that relies upon the experience of the manufacturing engineers in relating the specifications to a production control group responsible for order processing. The field of Materials Requirement Planning (MRP) was developed to address this problem.

Computers were introduced into the order planning process to deal with the complexity of the interrelationships between the features specified in an order. Batch processed computer applications were developed that translate a particular order into the sub-assemblies and parts required for its assembly. However, the batch oriented computer systems lack the flexibility to easily adapt to changes in design. Once a detailed specification was developed for a batch system it was difficult to change or modify the specification to react to changes in the design of the product. Finally, validation of the bills of materials produced by batch systems is frequently difficult due to an inability to interact with the system.

The problem of difficult maintenance of relationships has been addressed through the use of knowledge based systems ("expert systems") that provide an ability to separate the rules specifying the relationship between components from the inference logic used to analyze the order and produce the bills of material. For example, a system called XCON has been used by the Digital Equipment Corporation to process and check orders for their computer systems. A particular customer's order is analyzed to determine whether or not that order is complete and whether additional components are required.

A refinement of the XCON system was developed by Teknowledge, Inc. and is described in U.S. Pat. No. 4,591,983 to Bennett et al. issued May 27, 1986. The system described in the patent to Bennett et al. provides for easy maintenance and analysis of the engineering relationships between orders and component parts. The system provides tools and access so additional rules can be added and relationships modified as necessitated by design changes.

The use of knowledge based systems provides an improvement in the process used to analyze orders and generate completed bills of material. However, prior art expert systems suffer from the limitation that an entirely new knowledge base must be constructed for each application. For example, the system described in the Bennett et al. patent was prepared using the LISP programming language. The use of a knowledge based system descriptor language such as LISP results in the order planning system having its own knowledge base that is distinct from and potentially inconsistent with existing production system data bases. In a large enterprise selling a large volume of products, a significant amount of engineering effort has gone into the development of a database or knowledge base describing the specifications and relationships between parts and components. Requiring a separate knowledge base for order planning purposes causes significant wasted effort in conversion and problems due to potential differences in the order planning and actual manufacturing phases of the manufacturing process.

SUMMARY OF THE INVENTION

It is therefore an object of the present invention to provide a knowledge based order planning system that uses information specified in existing production engineering systems. Existing engineering systems which specify the relationship between components, device codes, and optional features in a first logical structure are used to derive a knowledge base having the flexibility and power to perform detailed order planning.

It is a further object of the invention to provide a knowledge based order planning system that has the flexibility to analyze different mixes and combinations of models and optional features to develop an order plan.

It is yet another object of the invention to provide a knowledge based planning system that allows for flexible interaction between the order planner and the knowledge base, supplies the rationale for the selection of particular order components, and provides explanations of the action of the system. Interactive order planning increases the effectiveness of the order planner.

It is yet another object of the invention to provide a system that generates a compact knowledge base allowing quick response to order interactive planning queries and analyses.

These and other objects of the invention will become clearer in the detailed description of the preferred embodiment that follows.

BRIEF DESCRIPTION OF THE DRAWING

The detailed description of the preferred embodiment of the invention will be given with reference to the following figures of the drawing.

DETAILED DESCRIPTION OF THE PREFERRED EMBODIMENT

An order planning system according to the present invention provides an ability to analyze a product order (specifying a particular model type and optional features) to develop a detailed bill of materials specifying the individual components necessary to manufacture and assemble the ordered product.

Figure 1:
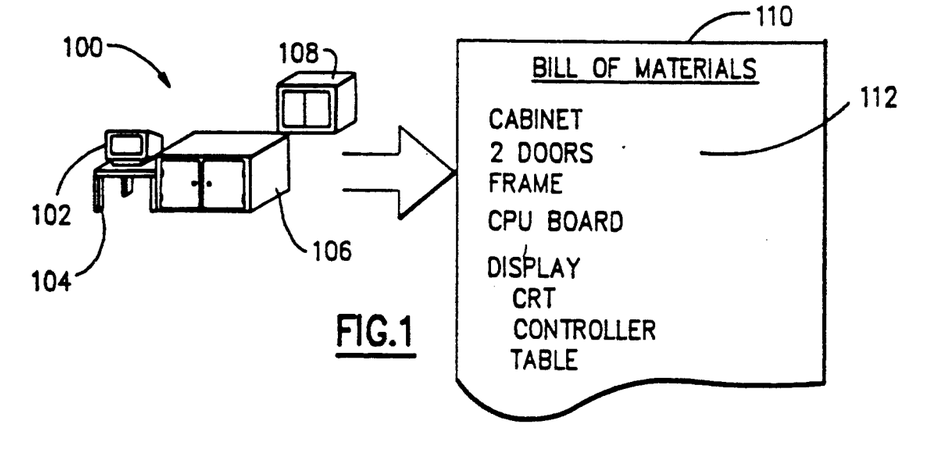
FIG. 1 is an illustration of an explosion from model and device descriptors to detailed bills of material containing component identifiers.

A simplified example of a product analysis is shown in FIG. 1. The particular configuration of a computer system is shown at 100 and comprises computer display 102, display table 104, a computer cabinet 106 and a storage device 108. Analysis of the configuration results in the bill of materials 110 which outlines, in detail, each of the individual components that make up the completed system. Each line item of the bill of materials, e.g. the doors 112, specifies a product component that must be assembled to produce the final product.

Each of the components listed on the bill of material may be exploded into a number of parts that must be manufactured or purchased. The explosion of components to parts occurs later in the production cycle and is not of concern in this invention.

The sales literature or descriptive information for the above product would typically specify the configuration in terms of a model, e.g. model 180 with various optional features, e.g. feature 100, a display terminal, feature 200, a display table, and feature 300, a storage device. An order specified in terms of these abstract parameters must be translated into detail sufficient to enable manufacturing and assembly of the desired component. An analysis of the example described herein is straightforward because it is comprised of few components; more complex devices, such as modern computer systems, may require hundreds of components to complete an order. The analysis of an order may result in the generation of 100-200 bills of material.

Figure 2:
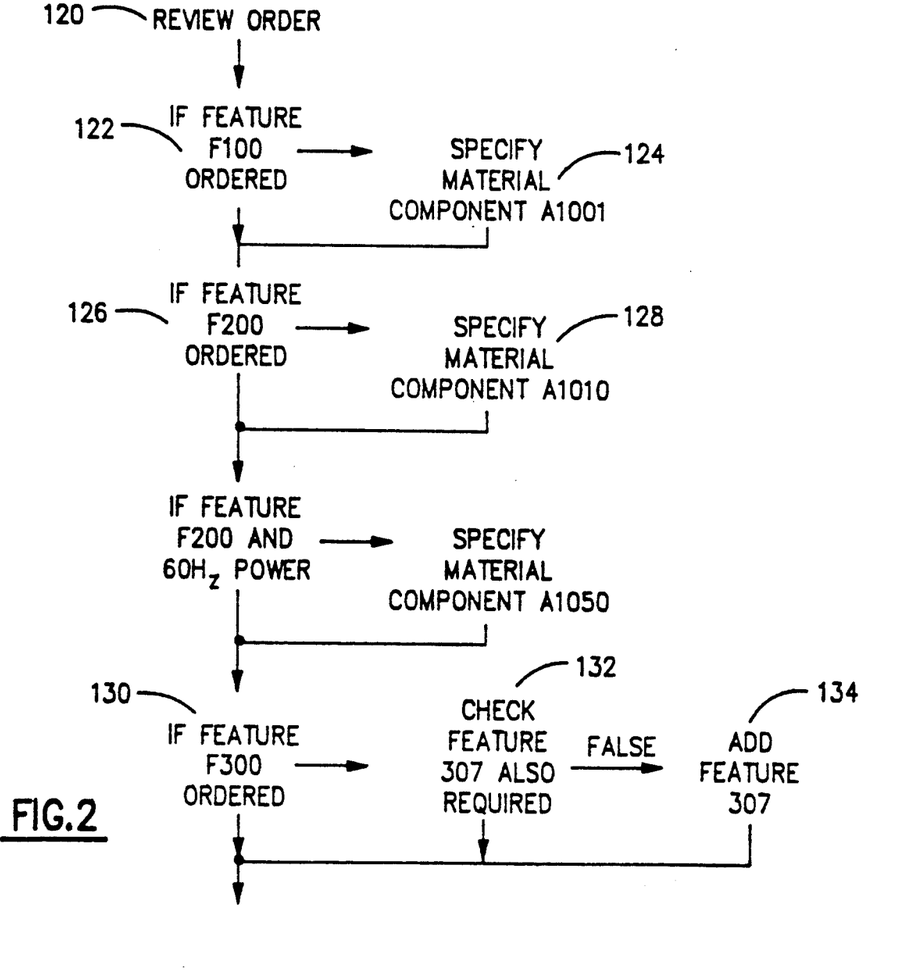
FIG. 2 is a flow chart of the logical steps of order processing.

Order analysis proceeds in a manner shown logically in FIG. 2. The process begins by reviewing the order 120. If a feature, e.g. F200, is found, then the required material component, e.g. A1001, is specified as an output to the bill of materials list 124. Next, a check is made of whether feature F200 is present, and if so, material component A1010 is specified 128. More complex relationships can be specified. For example, if feature 300 is ordered 130 then a determination is made of whether feature 307 has also been ordered 132 and if not, feature 307 is added to the bill of materials list at 134. Again the process and logic for modern manufacturing systems is considerably more complex.

The engineering relationships for a complex system can be expressed in a variety of ways. The preferred embodiment of the present invention works with a specification language known as LOSAT (language oriented systems analysis table.) This method is based on a description of the relationships in terms of this logical descriptive language. The present invention, however, is not limited to use with this single type of logical descriptor language and can be used in conjunction with any similar specification technique.

The logical descriptor language allows the specification of engineering relationships in terms of rule groups. Each rule group may specify a certain number of logical relationships that must be present and, depending upon the conditions satisfied, may assign a series of bills of material. An example of a rule group specification in LOSAT form is shown below:

Rule Group A

1. IF (D6661) THEN AL
2. SS EQ(2) * TWO OF THE ASSIGNMENTS MUST BE SELECTED
3. IF (D6661) THEN AS TD D6661 B372, B232 RS
4. IF (TD D6661, D6161, D6163) EQ(2) THEN AS (2) B739,B895 RS
5. IF (TD D6661) EQ(2) THEN AS B239, B894 RS
6. IF ( ) THEN AS B893.

The rule group specified, rule group A, contains the relationships for a certain portion of a final assembly. The first test, step 1, is whether feature D6661 has been ordered. If not, no further processing is done in this rule. The second statement indicates that two of the assignments must be selected as part of this processing. If this feature has been ordered then the next four tests are evaluated and the resulting components are assigned to the bill of materials list. Note that qualifying statement 2 requires that two of the assignments be selected causing varying assignments depending upon the conditions satisfied. The rules are processed in a top to bottom manner and once two assignments have been made, processing ceases. Each of the conditions has two parts, a left hand side (LHS) specifying a condition phrase that must be tested, and a right hand side (RHS) specifying the action phrase to take after a "true" evaluation of the condition phrase. For example, rule 3 has a left hand side condition phrase for determining whether feature D6661 has been ordered. If so, the right hand side requires that certain components be assigned (AS) to the bill of materials. The specification of "TD" requires that the total number of devices be determined and used as the quantity to specify for the following component. In this example, the total number of devices D6661 ordered will be used to determine the number of components B372 to be selected. Only one component B232 will be provided.

In a similar manner line 4 specifies that the total number of devices of D6661, D6161, and D6163 (or any combination) equals 2, then two components B739 and one component B895 are assigned. Finally, statement 6 provides the default condition that if none of the other rules have been selected then part B893 is assigned to the bill of materials list. The code 'RS' is hsort for 'or else', meaning the following condition must be evaluated.

The above example illustrates the difficulty of expressing and interpreting the engineering oriented LOSAT language. The logic statements provided are cryptic and difficult to analyze manually. Where a large number of feature codes and potential material components exist, the interaction of the many logic conditions and the interaction of the rule groups produces an increasingly complex analysis problem. A complex product may require specification and analysis of over six hundred interrelated conditions. An order planning function that attempts to predict potential orders and to plan for production capacities needs an ability to analyze the impact of subtle variations in assumptions. The cryptic nature of a language such as LOSAT makes this form of order planning extremely difficult and prone to human error.

The present invention is directed towards solving problems presented by the cryptic and ambiguous specification of engineering relationships. A knowledge based system according to the present invention takes the relationships expressed in the form of rule groups as described above, and transforms these rules into a compact knowledge base that provides flexible access and interaction for the order planners.

Figure 3:
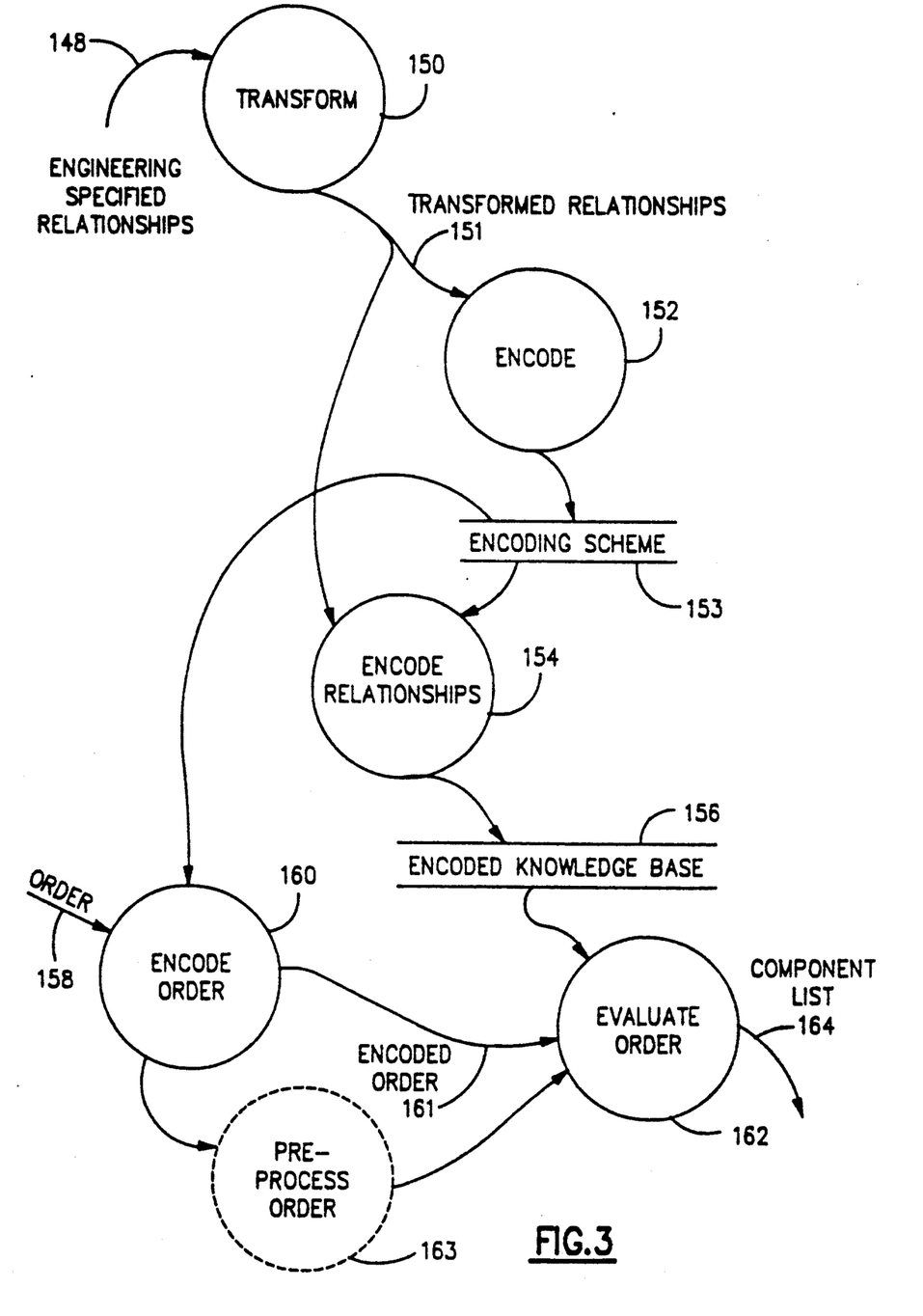
FIG. 3 is a dataflow diagram illustrating the data and processes of the present invention.

FIG. 3 illustrates the processing that occurs in a system according to the present invention. The system first transforms the engineering specified relationships 148 into an unambiguous description of the relationships at transform 150. The transformed relationships are encoded 152 to decrease the amount of computer storage space required by the knowledge base. The encoding scheme 153 is used at 154 to encode the relationships into a compact encoded knowledge base 156. This encoded knowledge base is used by the system to process the orders or planned orders to generate the bills of materials. An order 158 entering the system is first encoded 160 to form an encoded order string that is evaluated 162 by the knowledge based system to generate the final component list 164. Processing according to the present invention will be described in greater detail below.

The starting point for the system according to the present invention is a logical specification of engineering relationships 148 in a language such as LOSAT. These specified relationships must include a logical expression of the interrelationships between order models and features in terms of final component bills of material. The first step 150 of the present system transforms the relationships 148 specified in the first logical form into an unambiguous second logical form 151.

In the preferred embodiment, transformation 150 results in expressions that are unambiguously defined in disjunctive normal form. Disjunctive normal form provides a mechanism for expressing logical conditions unambiguously as a sum of elementary products. A description of disjunctive normal form can be found on pages 50-52 of *Discrete Mathematical Structures with Applications to Computer Science* published by McGraw Hill Book Company, copyright 1975.

The disjunctive normal form described above is expressed as a sum of elementary products. As discussed in the above referenced text, elementary products are products of "the variables and their negations". Product can also be expressed as an "and" term in a logic description. The sum of such products can also be expressed as logical "or" condition. The logical expression is shown above with respect to Rule Group A. Rules expressed in the first logical form can be transformed into disjunctive normal form by the application of known techniques of logical transformation resulting in a rule group comprising terms each linked by a logical "and" with lines each linked by a logical 4.

Figure 4A:
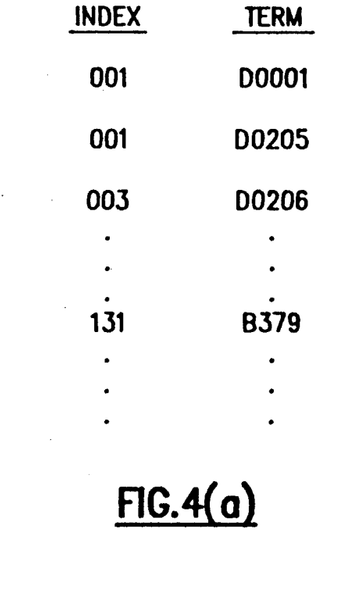
FIG. 4(a) is a table illustrating the indexing of the terms for encoding component relationships.
Figure 4B:
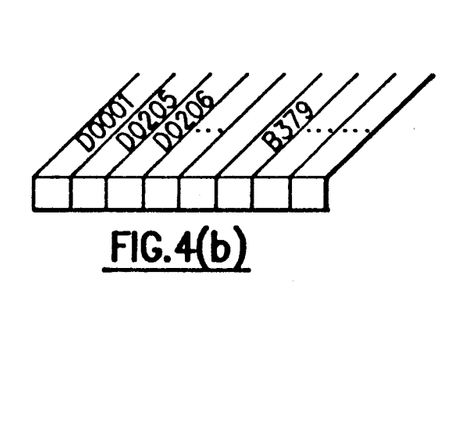
FIG. 4(b) illustrates an array of encoded reference identifiers.

The initial transformation of the engineering relationships 148 results in transformed relationships 151 expressed in unambiguous disjunctive normal form. Each of these relationships is still expressed in terms of model and feature codes such as D6661 in the above example. A more compact knowledge base can be created by encoding each of the descriptors, such as the model, feature, option, and material component specified for the bill of materials. In the preferred embodiment encoding 152 occurs through the assignment of an index number to each unique term in the transformed relationships. A reference array of the encoded terms in developed as shown in FIG. 4(a), the array can express the presence or absence of a particular item by switching a flag in the appropriate array position, or by incrementing a count of elements in that position, FIG. 4(b). The use of an array of integer values in the preferred embodiment allows significant increases in the speed with which the system processes the orders.

The encoded terms from the table as shown in FIG. 4(a) are used to encode the transformed relationships 151. This results in an encoded knowledge base 156 encoded in integer index terms.

Figures 5, 5B:
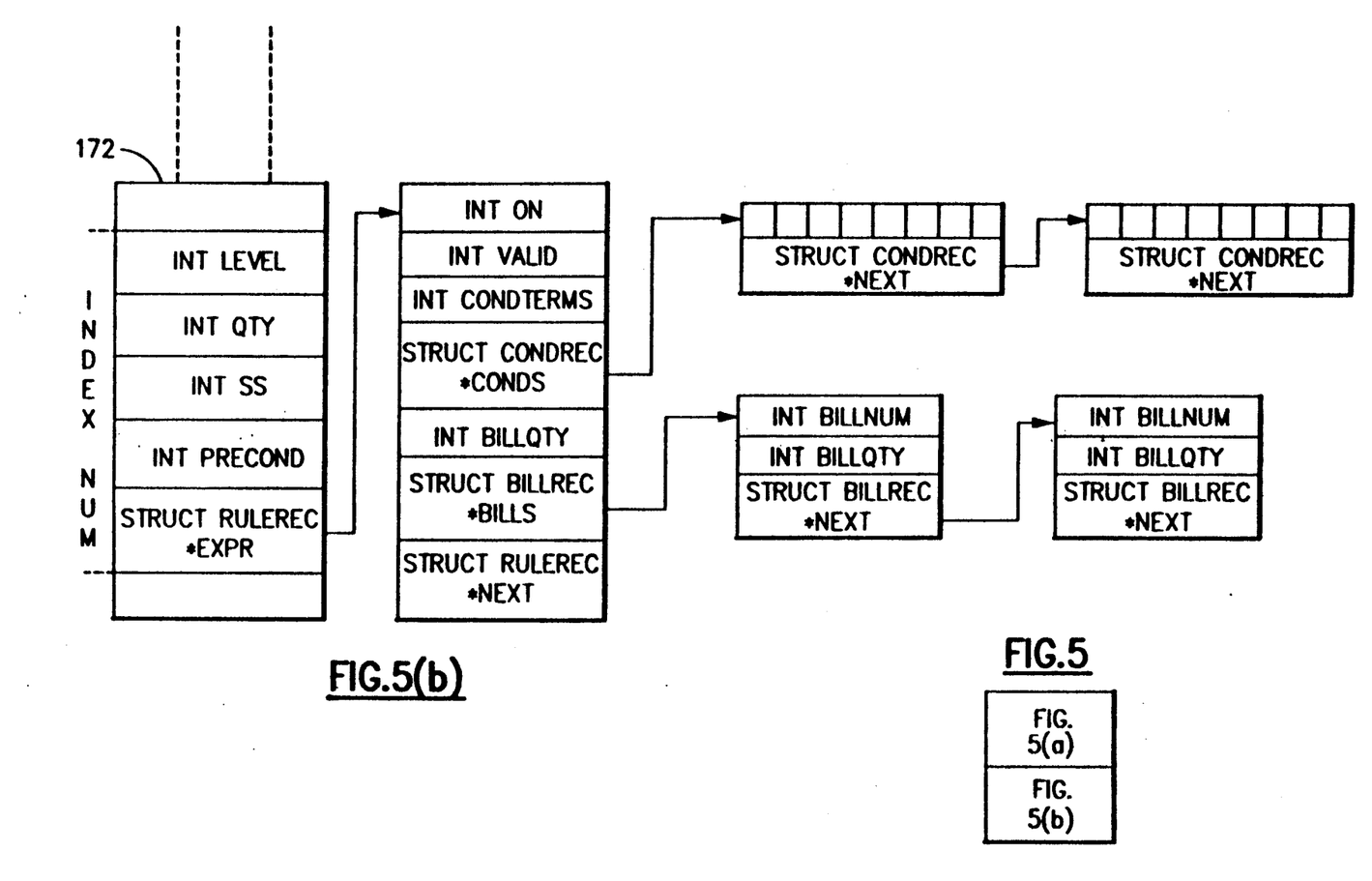
FIGS. 5A-5B illustrates an encoded knowledge base according to the present invention.
Figure 5A:
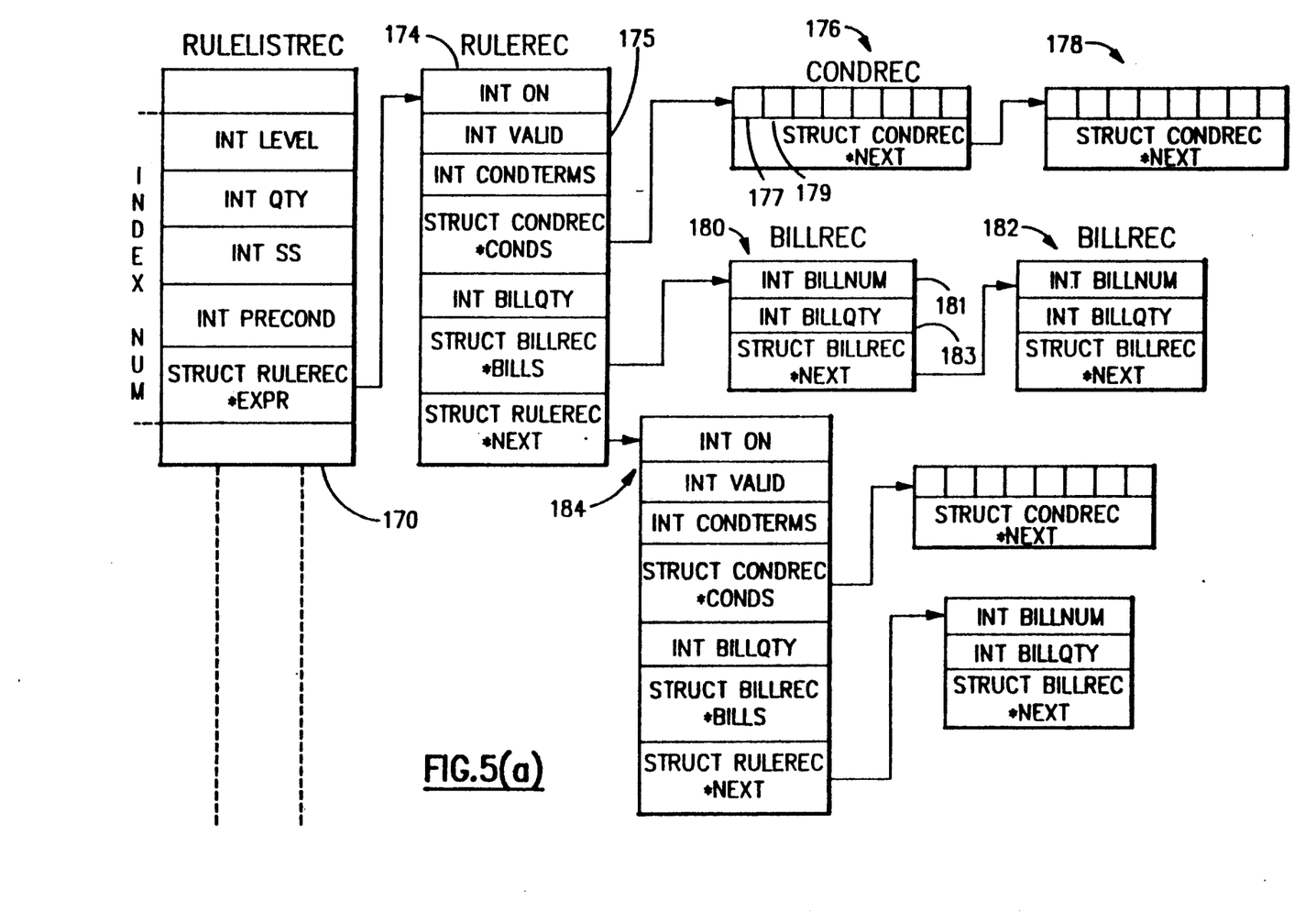

The preferred embodiment has implemented the encoded knowledge base as a set of linked lists containing the information regarding the rule groups, individual rules, conditions and material components to be assigned based upon satisfaction of the conditions. FIG. 5 represents the structure of a knowledge base according to the present invention. The highest level, the rule groups, such as that described above in the example, are grouped as an array of structures of rule groups. For example, in FIG. 5 rule group 170 through group 172 are in the array of rule groups. Each rule group contains a pointer to the first detailed rule for that rule group. The first rule of the list 174 contains basic descriptor information and pointers to linked lists of condition phrases (left hand side of the logical expression) and to the material components to be assigned by action phrases (the right hand side the expression). Each logical condition record 176 specifies a term group containing a portion of the logic using encoded terms from the reference array. The logical condition record represents the elementary product, or "anded" terms of the disjunctive normal form. These terms have been encoded as discussed above so that each takes up only a small amount of storage in the reference array. The relations between adjacent coded elements (e.g.177,179) are expressed in terms of logical AND. A compound condition can be constructed by specifying multiple condition records, for example, adding condition record 178.

The relationship between condition records is expressed in terms of a logical OR. Any number of condition records can be linked in the list for evaluation by the knowledge based system. After evaluation of the condition records, the evaluation system determines whether the rule has been satisfied, a true condition. If so, an indicator 175 is set to true later causing the material component records to be evaluated to determine the quantity and identity of material components to be assigned to the bill of materials during bill assignment processing. Control is then passed to the next rule record 184 after which the logical processing continues in a similar fashion.

After all rule records (174,184...) have been evaluated, the system determines which bills of materials to generate based on the bill records, e.g. BILLREC 180. Each rule record has a associated bill record that comprises a linked list of bills of material (180,182) containing an encoded bill number index 184, and bill quantity 183. If the rule valid flag 175 indicates that the conditions have been satisfied then all specified bills and quantities are assigned. The process proceeds through all rule records and rule groups.

The logic requiring that a certain number of assignments be made from each rule group is controlled by the rule group specifier 170 as the evaluation of the individual rule record proceeds.

Figure 7:
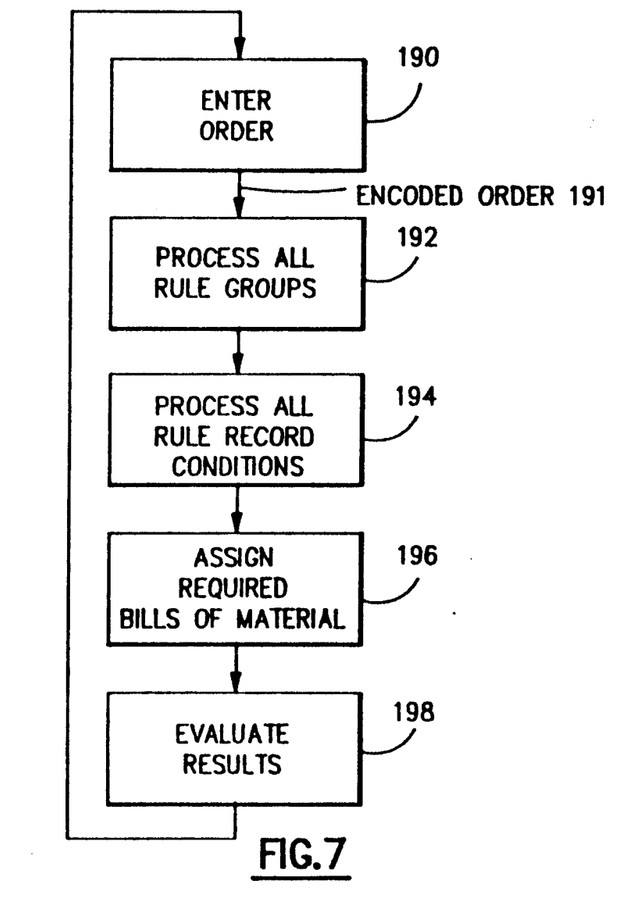
FIG. 7 is a flowchart of the operation of the inference engine.

A description of the order evaluation process is given with reference to FIG. 7. An order 158 must first be entered, encoded and presented to the evaluation mechanism to generate the final bill of materials 164. As used herein, order refers to an actual order or to a configuration under evaluation as a hypothetical order. An order can be presented to the system in a variety of ways. In one embodiment of the present invention, the order planner is queried to supply the model number, optional features, and quantities that comprise a particular order. In another embodiment of the invention, model number, features and quantity are presented in a particular format that can be encoded and evaluated using batch processing. It will be evident to those skilled in the art that a variety of interfaces to the order planner may be adapted for capturing the order data 158.

Figure 6:
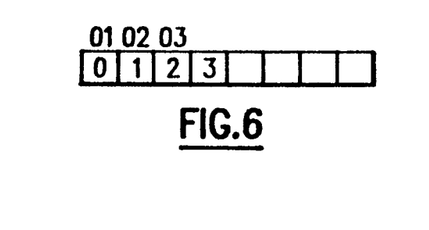
FIG. 6 illustrates an encoded order according to the present invention.

The order data is entered and encoded 190 using the encoding scheme 153. The result 191 is an order array similar to that shown in FIG. 6 that contains entries in the respective array positions indicating the model and optional feature characteristics of that order. This array can be efficiently processed against the condition arrays, e.g. condition array 172. Evaluation of indexed arrays instead of textual terms proceeds much more rapidly and provides an order planning system that is rapidly responsive to planner input.

The order is evaluated by order evaluation process 162. Order evaluation 162 comprises an inference engine operating on encoded knowledge base 156 based upon encoded order input 161. The inference engine is separate from the encoded knowledge base and therefore does not change as the knowledge base changes to recognize different models and devices or different logical relationships between the models and devices. Thus, the present invention allows the development of a single inference engine that can be used no matter how the logical relationships change. The inference engine operates to compare an encoded proposed assembly to the encoded knowledge base. The comparison step involves comparing the terms from the encoded proposed assembly to the condition terms of the encoded knowledge base. This comparison operates according to the logic expressed above with the description of the knowledge base. Inference engine 162 contains the logic necessary to trace the linked lists containing the rule groups, rule specifications, conditions and material component items. As shown in FIG. 7, the inference engine operates first to evaluate rule group and rule records, 192,194 and then to assign bills of materials 196.

The inference engine provides an interactive ability to evaluate the results 198. The operator can interactively query the system to determine what rule caused the generation of a particular bill. Retention of the rule validation flag 175 allows the operator to view the satisfied and unsatisfied rules. A flag in each condition record indicates whether or not it has been satisfied. The preferred embodiment retains the values for the last order evaluated, though this could be extended to additional orders. The assignment of bills 196 results in the creation of a linked list of assigned bills. A working array contains the quantity required for each bill. The linked list of reach bill regards each assigning rule group and quantity assigned.

If several orders are analyzed, an order history array is constructed containing the working array information of each order, i.e. bill of material and quantity. The complete linked list of assigning rule groups is maintained only for the last order.

Complex logical relationships expressed in the first LOSAT logical form can be dealt with in the present system by separating logical processing from the rule base by substituting a pseudo device for that complex construct. Pre-processing of the order information prior to order evaluation at 162 is required to create the necessary pseudo devices. This pre-processing 163 results in a different order array that once again can be tested against the encoded knowledge base 156.

The above system describes a mechanism for using an existing database specifying engineering relationships between device models, feature options and the resulting material components to construct a knowledge based order planning system. The existing syntax and semantics of this first database are retained and used by the present system to explain the results achieved by that system. This allows rapid training and development of familiarity with the new system. Retention of the syntax and semantics of the original database provide for the continued use of the engineering database in existing situations while allowing the flexible planning system to operate from the same data. The integrity of the original data remains intact. In this way, order planning, order processing and final manufacturing and engineering are consistent and can be maintained concurrently.

The use of the disjunctive normal form to express the relationships exposes the underlying rule logic and helps to verify that logic. The normalize rules can be evaluated by the engineer and a determination can be made on their validity and hence of the validity of the original LOSAT rules. Interactive order analysis allows the engineer to determine the results of relationship specifications.

The above description of the present invention is described in terms of preferred embodiment with certain restrictions and limitations. It will be recognized by those in the field that a number of changes and modifications to the above structure can be made. The above description is not intended to be limiting of the invention and other, alternative embodiments come within the claims of the invention. It is intended that this description is for the purposed of illustration only and should not be considered in a limiting sense. The scope of this invention should be limited only by the language of the following claims.

What is claimed is:

1. A method for determining component requirements for a assembly said method operating in an computer system having storage means for storing computer readable data, wherein component specifications and relationships for a finished assembly are specified in a first logical form having terms and operators on those terms, the method comprising the steps of:

transforming said specifications and relationships from said first logical form to an unambiguous second logical form having the same terms;

encoding each term in said second logical form by assigning a unique identifier to each distinct term;

transforming said specifications and relationships in said second logical form into rules in an encoded knowledge base by replacing each term with its respective encoded term; encoding said proposed assembly configuration using said encoded terms;

generating a list of said component requirements by:

generating satisfied rule indicators by comparing said encoded proposed assembly configuration to said encoded knowledge base; and assigning a component requirement to said list of component requirements by evaluating said satisfied rule indicators using said encoded knowledge base.

2. The method of claim 1 wherein the computer system has an interactive operator device an, wherein the method further comprises the steps of:

receiving a query from said interactive operator device, interactively responding to said query based on said satisfied rule indicators.

3. The method of claim 2 further comprises the stop of:

generating a decoded description of a portion of said encoded knowledge base in response to a query from said interactive operator device.

4. The method of claim 1 wherein said proposed assembly configuration is interactively entered through an operator device attached to said computer system.

5. The method of claim 1 wherein said proposed assembly configuration is accessed from said storage means, 6. A knowledge system comprising:

a processing element storage means for storing a first and a second knowledge base;

a control procedure and a means for executing said control procedure;

said first knowledge base including specifications of relationships between an order model and a device code and a resulting list of manufacturing components requirements;

said second knowledge base including encoded specifications of relationships expressed in unambiguous form;

order entry means for entering an order configuration to be analyzed;

an index for encoding said order configurations and decoding a result, said control procedure including a first procedure for transforming said first knowledge base into said second knowledge base, and a second control procedure for determining a required bill of materials list for said order configuration by evaluating said order configuration according to said encoded relationships.

7. A method for assembling a list of bills of materials for a manufactured item specified by a proposed assembly configuration, said method being implemented on a computer system, having processing means, storage means and user interaction means wherein said configuration is specified in terms of a first level and a second level configuration identifier, and wherein a specification exists for assigning bills of material to said list of bills of materials when certain combination of configuration identifiers and specified, said method comprising the steps of:

transforming said specification into a set of unambiguous rules each having a conditional phrase and an action phrase, determining whether each conditional phrase is satisfied by said proposed assembly configuration;

performing said action phrase in said conditional phrase it satisfied wherein said action phrase assign bill of material to said list of bills of material.

8. The method of claim 7 wherein said set of unambiguous rules are encoded by replacing each term in said rules by an index number reference said term.

9. The method of claims 7, wherein said transforming step causes said specifications to be transformed into rules in disjunctive normal form.

10. The method of claim 8, wherein said proposed assembly configuration is encoded using said index numbers used to encode said rules and wherein said determining step operates on said encoded rules and said encoded proposed assembly configuration.

11. The method of claim 10, wherein said proposed assembly configuration is entered by interactively querying a user of said computer system.

12. The method of claim 7, further comprising the steps of:

storing a selection indicator of satisfaction or non-satisfaction with each of said conditional phrases; and storing and assignment indicator specifying the rule causing assignment of a bill of material to send list of bill of material, and interactively displaying said list of bills of material, said rules with said selection indicator, or said assignment indicators in response to a user interaction with said computer system.

* * * * *